July 22, 1924.
F. J. TONE
1,502,070
OVEN OR FURNACE
Filed July 6, 1922
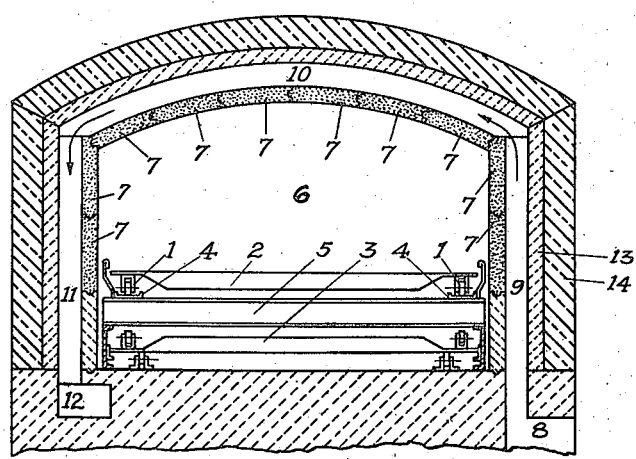
INVENTOR
Frank J. Tone Patented July 22, 1924.

1,502,070

UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

OVEN OR FURNACE.

Application filed July 6, 1922. Serial No. 573,151.

*To all whom it may concern:*

Be it known that I, FRANK J. TONE, a citizen of the United States, residing at Niagara Falls, county of Niagara, and State of New York, have invented certain new and useful Improvements in Ovens or Furnaces, of which the following is a specification.

This invention relates to the construction of ovens and furnaces and has for its object to provide an oven wherein articles may be heated, heat treated, or annealed in an efficient manner. It particularly relates to the construction of glass lehrs of the muffle type and refers to the use in the wall construction of silicon carbide refractory material as the conducting medium for transmitting the heat to the glass. Its application will be more readily understood by reference to the drawing forming a part hereof wherein Figure 1 represents a vertical sectional view of a muffle lehr of a type in common use taken through one of the combustion chambers or heat flues.

Describing the various parts by reference to the characters in the drawings, the glass articles, as is well known, are carried continuously through the lehr on a long horizontal conveyor consisting of two parallel chains 1, 1, with iron plates or pans, 2 and 3, arranged crosswise of the chains and the opposite ends of the pans supported by links of the chains. The chain is provided with rollers which run on rails 4, 4, supported by a cross I beam 5. The upper pan conveyor 2, carrying the load of glass through the lehr passes over sprocket gears at entrance and exit end of the lehr, as is well known, and the lower pan conveyor 3 is the return conveyor passing back through the muffle chamber to the entrance end. The chain conveyor and pans with its load of glass is enclosed on the sides, roof and bottom in a long muffle chamber 6, and the sides and roof of this chamber are composed of silicon carbide plates or tile 7, 7, 7. The plates or tile forming the roof as shown are supported between the side walls in the form of a circular arch, but my invention may be used equally well with the several well known types of suspended flat arch constructions in common use. Around this muffle chamber is a space comprising the heat flues or combustion chambers. Several of these combustion chambers are provided extending side by side across and over the muffle chamber. The means of heating may be gas, oil or other means. The gas and preheated air are brought together at the entrance of the combustion chamber 8, where combustion begins. The hot gases then go up the passage 9, at the side of the muffle, over the roof passage 10, and down the side passage 11 on the opposite side to an outlet flue 12. Around the combustion chamber and forming its exterior wall is an ordinary refractory structure consisting of fire brick 13 with an outside layer of insulating brick 14.

In order to remove the strains in the glass which is the purpose of the lehr, it is necessary to raise the temperature of the glass articles to a point which is as high or higher than that at which they disappear and to maintain this temperature until the glass has become thoroughly and uniformly heated, after which the cooling cycle begins.

The problem of annealing glass is one of the most difficult in heat treating operations. One of the principal reasons is on account of the difficulty of bringing the glass to a uniform temperature and maintaining it at this temperature throughout the soaking period. Unlike metals, for example, glass is not a good conductor of heat and does not tend to attain a uniform temperature throughout its mass so quickly. Also being substantially transparent to heat rays, it must be heated principally by convection of the hot gases in contact with it.

I have discovered that the use of silicon carbide tile in place of ordinary fire brick tile in the partition which transmits the heat from the combustion chamber to the muffle chamber results in effecting economies and improvements of the highest importance. There is not only a very great economy in fuel consumption but the heat is brought more uniformly to the glass so that the time of treatment has been reduced and the losses are less. I have discovered that silicon carbide refractories have several properties which function together in a way to give most efficient results in fuel economy, speed of treatment, and quality of product when used for this purpose. Important among these properties are thermal conductivity and heat emissivity.

The thermal conductivity of silicon carbide is about five times that of fire clay refractories. The faster the heat is conducted through the lehr walls, the more heat will be absorbed at the surface by the colder gases, and the reverse is also true that the more rapidly the heat is conducted from the hot surface of the wall to the cold surface, the more rapidly will the heat be emitted at the cold surface, other factors being equal. The high heat conductivity of the silicon carbide wall of the lehr therefore enables a greater portion of the heat of the combustion chamber to be transmitted to the lehr, resulting in a greater fuel economy. It also results in enabling the lehr to be operated more rapidly and thus gives greater production.

I believe however that the greatest factor in the favorable results obtained is due to the high emissivity. The emissivity factor of a substance is the measure of its capacity to take up heat at the surface where it comes in contact with the substance carrying the heat, and likewise the factor which represents its capacity to similarly give up this heat at its surface to a colder medium, the factors being the same in each case. The emissivity factor of silicon carbide at 1000° C. is 0.10 gram calories per square centimeter per second or about two times greater than that of an ordinary fire clay refractory. This means that when silicon carbide is in contact with hotter gases, it will, other things being equal, take up the heat from the gases two times faster than fire clay, and likewise will emit the heat to colder gases at the same relative rate. It is apparent that this factor is of prime importance in a lehr wall material. On account of the high emissivity of the silicon carbide walls, there is a more rapid exchange of heat between all the walls of the lehr chamber, the bottom of the lehr, the conveyor, the atmosphere, and the glass which is being treated. This results in a better or more rapid equalization or a more rapid averaging of the heat in the chamber; this having the further result that it more rapidly brings the glass to a uniform temperature. Uniformity of heat distribution is a very controlling factor in the time required for the annealing period.

Other properties of silicon carbide refractories which make them valuable for glass lehr construction in the manner herein described are their high mechanical strength, their great resistance to high temperature, low co-efficient of expansion, and good heat capacity.

This improved type of construction may be applied not only to the treatment of glass but of any vitreous article or other material requiring similar treatment.

I claim:

1. A muffle flue for furnaces, composed on three sides of clay tile and on the heat radiating side of silicon carbide, substantially as described.

2. A muffle lehr having an article-receiving chamber and flues having portions thereof forming parts of the chamber wall and formed of material having relatively high heat conductivity, the flues having other portions of material having relatively low heat conductivity, and means for passing combustion products through said flues, substantially as described.

3. A muffle lehr having a heating chamber, roof and side walls for said chamber, said roof and walls comprising a plurality of muffle flues each having on three sides material of relatively low heat conductivity and on the side next said heating chamber material of high heat conductivity, substantially as described.

4. A muffle lehr having a heating chamber, roof and side walls for said chamber, said roof and walls comprising a plurality of muffle flues each of which has on three sides material of relatively low heat conductivity and on the side next said heating chamber material of high heat conductivity and great mechanical strength, substantially as described.

5. A muffle lehr having an article-receiving chamber comprising a roof and sides, with a heating space surrounding such roof and sides, the space on each side of such chamber being provided with vertical flues, the inner walls whereof form parts of the chamber wall, such inner walls and the said roof being composed in part, at least, of silicon carbide.

6. A muffle lehr having an article-receiving chamber comprising a roof and sides, with a heating space surrounding such roof and sides, the said space being provided with flues extending continuously across the said space and around the said chamber, the inner wall of each such flue forming part of the chamber wall, such inner walls being composed in part, at least, of silicon carbide.

FRANK J. TONE.